UNITED STATES PATENT OFFICE 2,453,858

PROCESS FOR OBTAINING RUBBER FROM GOLDENROD LEAVES

Nandor Porges, Metairie, and Elisha F. Pollard and James J. Spadaro, New Orleans, La., assignors to the United States of America as represented by the Secretary of Agriculture No Drawing. Application March 24, 1945, Serial No. 584,680

2 Claims. (Cl. 195—2)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for obtaining rubber from goldenrod material, and has among its objects the provision of a process for preparing the goldenrod material by microbiological activity with subsequent solvent extraction of the prepared material to recover the rubber.

The rubber content of dry goldenrod leaves from selected strains is about from 4 to 7 percent by weight. At the present time, one method of obtaining the rubber from shrub plants is by mechanically disintegrating the whole shrub in the presence of water and agglomerating the rubber in a ball mill, whereupon the rubber separates and floats on the water. The separated rubber so obtained from goldenrod contains large amounts of fiber and resin. Another method used depends upon the mechanical disintegration of the plant material in a dilute alkali hydroxide solution, after a resin extraction, and recovery of the floating drops of goldenrod rubber.

We have found that a considerable portion of the non-rubber substances in goldenrod material can be removed after microbiological breakdown, thus decreasing the bulk of material handled in the extractors. After the water-soluble substances are removed and the plant material is dried, the rubber is solvent-extracted at a faster rate than it is extracted from the original goldenrod. A purer rubber is obtained when resins are extracted prior to the extraction of the rubber.

According to the invention, a goldenrod material, comprising the leaves stripped from the goldenrod plant, or the complete plant itself, is placed in a suitable container. The material is then covered with an aqueous suspension of desired culture, preferably that obtained from digested sludge. After about 3 days, the liquor becomes very acid, that is, spent, and is discarded. Fresh aqueous inoculum is then added at intervals of time followed by draining. When the mass has reached a desired state of disintegration, it is washed with water, pressed, and dried. The dried mass is then ground, the resins extracted with a resin solvent such as acetone, and the rubber then extracted with a rubber solvent such as benzol. The resulting benzol solution of rubber may be further treated with acetone to remove additional resins and thus give a purer rubber.

We have found that an inoculum made from digested sludge obtainable from a sewage plant is rich in the desired microorganisms which cause rapid disintegration of the goldenrod material. The inoculum is prepared by diluting the sludge with sufficient water, a nutrilite, such as peptone, being added if desired. A preferable inoculum favoring marked reduction in weight of the goldenrod is obtained by mixing about from 15 to 30 parts of water with about 1 part of sludge and using the supernatant liquor of the mixture after it has settled overnight.

Microbiological disintegration of goldenrod material may remove as much as 65 percent of the resin depending on the period of treatment. For example, resins can be extracted in about 4 to 8 hours in such microbiologically disintegrated material as compared to a perod of about 24 hours in untreated controls. Furthermore, goldenrod leaf material disintegrated to the desired degree need not be ground before extraction. The bulk of rubber in the disintergrated leaves is extracted in about 4 to 12 hours, whereas about from 13 to 24 hours are required for the untreated control. The resin content of the rubber extract is also reduced by microbiological disintegration.

Although the microbiological digestion has been conducted at temperatures as low as 15° C., it is preferred to conduct them at temperatures between about 30° and 40° C.

The following examples are illustrative of the invention:

EXAMPLE I

Ten pounds of dry goldenrod leaves were placed in 6 oak barrels and covered with a digested sludge inoculum. The inoculum was the supernatant liquor obtained from a mixture of about 1 part of digested sludge with about 15 parts of water after it has stood overnight. After 3 days, the spent liquor was drained, and daily thereafter the leaves were mixed with about 2 gallons of inoculum which was drained off after standing for about 30 minutes. At the end of 11, 16, and 21 days, the contents of 2 barrels were removed, washed, dried at about from 120°–140° F. and extracted for about 24 hours with acetone to remove the resins, followed by about 24 hours extraction with benzol to remove the rubber. Part of the treated leaf material was ground before extraction. An example of the data obtained is shown in the following Table I:

Table I

| Period of Treatment | Reduction in Dry Weight | Preparation of Material | Acetone Extract | Benzol Extract |
|---|---|---|---|---|
| Days | Per cent | | Per cent | Per cent |
| 0 | 0 | Ground | 18.3 | 7.2 |
| 11 | 30 | do | 9.3 | 8.0 |
| 11 | | Unground | 8.1 | 6.1 |
| 16 | 35 | Ground | 8.5 | 7.6 |
| 16 | | Unground | 8.2 | 7.4 |
| 21 | 38 | Ground | 8.3 | 7.5 |
| 21 | | Unground | 9.0 | 8.3 |

The microbiological activity has reduced the dry weight of the leaf material, the acetone-soluble substances have been decreased by about 50 percent, and the benzol extract has been increased. Grinding favored more complete extraction especially in the early stages of disintegration of the goldenrod material.

EXAMPLE II

The same conditions were used as in Example I with a separate lot of leaves. The advantage of microbiological disintegration upon the speed of acetone extraction is shown by the data in the following Table II:

Table II

| Period of treatment | Preparation of material | Time of extraction in hours | | | | |
|---|---|---|---|---|---|---|
| | | ½ | 1 | 4 | 12 | 24 |
| | | Per Cent Acetone Extract | | | | |
| Days | | | | | | |
| 0 | Ground | 4.9 | 6.1 | 8.8 | 11.6 | 13.9 |
| 7 | do | 4.6 | 5.8 | 7.0 | 7.4 | 7.7 |
| 7 | Unground | 2.9 | 3.3 | 5.1 | 5.9 | 6.1 |
| 11 | Ground | 5.1 | 5.8 | 7.0 | 7.4 | 7.6 |
| 11 | Unground | 3.0 | 3.9 | 5.5 | 6.4 | 6.7 |
| 21 | Ground | 3.3 | 3.9 | 4.9 | 5.0 | 5.1 |
| 21 | Unground | 2.7 | 3.5 | 4.7 | 4.9 | 5.1 |

The 7-day and 11-day disintegration caused a reduction of 50 percent in the acetone-soluble substances originally present in the leaves, while the 21-day period reduced the resins by 65 percent. The speed of extraction of the resins remaining in the microbiologically treated leaves was increased appreciably with treatment time. Practically all of the acetone solubles were removed in the first 4 hours of extraction from the material disintegrated for 21 days.

EXAMPLE III

The goldenrod material left after acetone extraction in Example II was used for benzol extraction. Trends similar to those in the acetone extraction of Example II were evident. Ground leaves from the 7-day and 11-day treatment were extracted more readily than unground material and required only about 4 hours to remove the bulk of rubber as compared to a period about from 12 to 24 hours for the untreated control. Leaves disintegrated for 21 days required only about 4 hours for benzol extraction whether ground or unground. An example of the data obtained is shown in the following Table III:

Table III

| Period of treatment | Preparation of material | Time of extraction in hours | | | | |
|---|---|---|---|---|---|---|
| | | ½ | 1 | 4 | 12 | 24 |
| | | Per Cent Benzol Extract | | | | |
| Days | | | | | | |
| 0 | Ground | 2.1 | 2.2 | 3.3 | 4.3 | 5.2 |
| 7 | do | 2.0 | 3.3 | 4.5 | 4.8 | 5.0 |
| 7 | Unground | 1.0 | 1.5 | 2.8 | 3.3 | ¹3.7 |
| 11 | Ground | 2.4 | 3.5 | 4.3 | 4.5 | ¹4.7 |
| 11 | Unground | 1.1 | 1.6 | 2.5 | 3.3 | ¹3.6 |
| 21 | Ground | 0.9 | 2.0 | 2.6 | 2.7 | ¹2.8 |
| 21 | Unground | 1.5 | 1.9 | 2.6 | 2.9 | ¹2.9 |

¹ Loss of rubber was mechanical resulting from excessive screening during washing.

EXAMPLE IV

Five thousand two pounds of freshly harvested goldenrod plants were cut by machine into one-inch strips and filled into four 600-gallon cypress tanks. The plant material was covered with a 15 to 1 water sludge inoculum and peptone was added. No attempt was made to maintain optimum temperature. After 3 days, the spent liquor which had become acid was discarded and the mass mixed in order to avoid localized pickling action. Thereafter, the disintegrating mass was inoculated daily with fresh culture, mixed, and drained after a 2-hour contact period. On the twenty-second day, the leaf material had reached the desired state of disintegration. Washing was accomplished by filling with water and draining the tank three times. The mass was passed through a screw press, shredded and dried at about 165° F. in an air kiln. One thousand four hundred and forty-three pounds of dry material were obtained from the 5,002 pounds of green charge which was originally equivalent to 2,251 pounds of moisture-free plants, indicating a reduction in weight of about 36.9 percent. The dry disintegrated material was separated from the stems by air blast and extracted. The bulk of the rubber remained in the leaf fraction. The following data are typical of some of the results obtained under laboratory conditions and on a pilot plant scale:

Extractions of original plant samples gave a resin acetone extract of 5.90 percent and a crude rubber benzol extract of 1.67 percent of which 15.3 percent was resins, leaving 1.40 percent resin-free benzol extract. Analytical results for resin-free rubber for various fractions gave the following: 100 pounds of the original dry material which contained 1.40 percent rubber was reduced by microbiological disintegration to 64.2 pounds containing 2.25 percent rubber. The 64.2 pounds were divided into 26.6 pounds of leaf fraction containing 4.12 percent rubber and 37.6 pounds of stem fraction containing 0.91 percent rubber.

The final leaf fraction was ground and extracted for about 6 hours with acetone and then for about 12 hours with benzol yielding, respectively, 12.3 percent acetone extract and 4.38 percent benzol extract, the latter containing 7.5 percent resins. Thus, the resin-free rubber amounted to 4.05 percent, indicating that 98.2 percent of the rubber present in the leaf fraction was recovered.

EXAMPLE V

One tank was filled with 1,206 pounds of green goldenrod leaves stripped from the plant and allowed to disintegrate microbiologically, as in Example IV, for 20 days. The weight of material on a moisture-free basis was reduced from 441 pounds to 258 pounds, giving a reduction in weight of 41.6 percent. Analyses showed that on a moisture-free basis, 100 pounds of the original material contained 3.24 percent resin-free rubber. Microbiological disintegration reduced this to 58.5 pounds containing 5.54 percent rubber, showing an increase in rubber concentration of 72 percent.

EXAMPLE VI

Two thousand seven hundred and eight pounds of stripped green leaves, equivalent to 906 pounds dry weight were filled into two tanks and treated, as in Examples IV and V, for 18 days. Mixing was aided by forcing compressed air through the mass. After this period of disintegration, the dry weight was 638 pounds, showing a reduction of 29.6 percent. This disintegrated material was dried and separated into a leaf fraction and a stem fraction. By analysis, the following were obtained: 100 pounds of the dry green material containing 2.88 percent rubber was reduced in weight to 70.3 pounds containing 3.51 percent rubber. The leaf fraction weighed 55.8 pounds and contained 4.28 percent rubber while the 14.5 pounds of stem fraction contained 0.52 percent rubber. The original control sample contained 15.95 percent acetone extract, 3.36 percent benzol extract of which 17.3 percent was resins, leaving 3.24 percent as resin-free rubber. Pilot plant extraction of the disintegrated and ground material gave 20.1 percent acetone extract, 4.5 percent benzol extract of which 4.9 percent was resins, leaving 4.28 percent as resin-free rubber. This showed that 100 percent of the rubber was extracted and that the resin content of the rubber was markedly reduced.

EXAMPLE VII

The crude rubber present in the benzol extracts, obtained in Examples IV, V, and VI, was purified by adding 2 volumes of acetone to the benzol extract. The rubber precipitated and most of the acetone-soluble resins were removed in the acetone solution. The following data were obtained:

Resins in crude rubber from microbiologically disintegrated material amounted to 4.9 percent and 10.4 percent in two samples. After acetone precipitation, the recovered rubber showed 1.1 percent and 2.0 percent resins. Resins in crude rubber from the untreated fresh control material were 17.3 percent and 20.6 percent in the two samples. After acetone precipitation, the recovered rubber showed 7.9 percent and 8.0 resins. Microbiological disintegration decreased the resin content of the benzol extract and changed the state of the resins so that they were more readily removed by the acetone.

Having thus described our invention, we claim:

1. A process of obtaining rubber from goldenrod leaves comprising inoculating said leaves with digested sewage sludge inoculum, allowing the disintegrating microorganisms of the inoculum to act until the liquor becomes spent, draining the spent liquor, reinoculating the leaves at intervals and draining after inoculations as the liquor becomes spent, until microbiological disintegration of the non-rubber constituents of the leaves has been effected to the extent that the weight of the goldenrod leaves, on a dry-weight basis, has been reduced about by 29.6 to 41.6 percent, treating the disintegrated leaves with a resin solvent to extract the resins and then treating the leaves with a rubber solvent to extract the rubber, purifying the rubber solution by adding acetone to precipitate the rubber, and finally recovering the precipitated rubber.

2. The process of claim 1 wherein the rubber solvent is benzol.

NANDOR PORGES.
ELISHA F. POLLARD.
JAMES J. SPADARO.

REFERENCES CITED

The following references are of record in the file of this patent:

UNITED STATES PATENTS

| Number | Name | Date |
|---|---|---|
| 140,282 | Lamb | June 24, 1873 |
| 1,918,671 | Spence | July 18, 1933 |
| 1,976,327 | Chittenden | Oct. 9, 1934 |
| 2,116,089 | Wallerstein | May 3, 1938 |
| 2,408,853 | Hoover et al. | Oct. 8, 1946 |

OTHER REFERENCES

Tanner-Bacteriology, 3rd ed., John Wiley & Sons, page 21.

Bergey's Manual, 5th ed., Williams & Wilkins Co., page 647, lines 12 and 13 and 648, lines 39 to 41.